US007775669B2

(12) United States Patent
Liao et al.

(10) Patent No.: US 7,775,669 B2
(45) Date of Patent: Aug. 17, 2010

(54) ILLUMINATION SYSTEM

(75) Inventors: Chien-Chung Liao, Hsinchu (TW); Chin-Ku Liu, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 334 days.

(21) Appl. No.: 11/856,058

(22) Filed: Sep. 16, 2007

(65) Prior Publication Data

US 2008/0174994 A1 Jul. 24, 2008

(30) Foreign Application Priority Data

Jan. 18, 2007 (TW) .............................. 96101883 A

(51) Int. Cl.
*G03B 21/14* (2006.01)

(52) U.S. Cl. ........................... 353/94; 353/31; 359/630; 362/231

(58) Field of Classification Search .................. 353/31, 353/98, 99, 94; 349/5, 7, 8, 9; 359/630; 362/555, 561, 231, 800
See application file for complete search history.

(56) References Cited

U.S. PATENT DOCUMENTS

| | | | | |
|---|---|---|---|---|
| 5,625,738 A | | 4/1997 | Magarill | |
| 6,767,112 B2 | | 7/2004 | Wu | |
| 6,769,773 B1 | | 8/2004 | Wu | |
| 7,059,726 B2 | * | 6/2006 | Engle | 353/81 |
| 2006/0114423 A1 | * | 6/2006 | Maeda et al. | 353/94 |
| 2006/0274284 A1 | * | 12/2006 | Peterson et al. | 353/84 |
| 2007/0132962 A1 | * | 6/2007 | Kitamura | 353/33 |

FOREIGN PATENT DOCUMENTS

| | | |
|---|---|---|
| CN | 1109914 | 5/2003 |
| CN | 1816766 | 8/2006 |
| WO | 2004/107018 | 12/2004 |

OTHER PUBLICATIONS

"1st Office Action of China counterpart application", issued on Jul. 10, 2009, p. 1-p. 7.

* cited by examiner

*Primary Examiner*—William C Dowling
(74) *Attorney, Agent, or Firm*—Jianq Chyun IP Office

(57) ABSTRACT

An illumination system including a first integrator, a first dichroic element, a second dichroic element, a first light source, and a second light source is provided. The first integrator has a first light incident end and a first light exit end. The first and the second dichroic elements are respectively disposed at two different parts adjacent to the first light incident end. The first dichroic element, the second dichroic element, and the first light incident end are arranged along a triangular track. The first light source emits a first color light. The second light source emits a second color light. The first color light passes through the first dichroic element and is partially reflected by the second dichroic element to the first light incident end. The second color light passes through the second dichroic element and is partially reflected by the first dichroic element to the first light incident end.

23 Claims, 9 Drawing Sheets

ILLUMINATION SYSTEM

CROSS-REFERENCE TO RELATED APPLICATION

This application claims the priority benefit of Taiwan application serial no. 96101883, filed Jan. 18, 2007. All disclosure of the Taiwan application is incorporated herein by reference.

BACKGROUND OF THE INVENTION

1. Field of the Invention

The present invention relates to an illumination system. More particularly, the present invention relates to an illumination system suitable for applying to a projection apparatus.

2. Description of Related Art

Referring to FIG. 1, the conventional illumination system 100 is composed of a first light-collecting module 110, a second light-collecting module 120, and a dichroic mirror 130. The first light-collecting module 110 is composed of a light source 112, a rod integrator 114, and a lens 116, and the second light-collecting module 120 is composed of a light source 122, a rod integrator 124, and a lens 126. The light source 112 is suitable for emitting a first color light 113, wherein the first color light 113 transmits to the dichroic mirror 130 after passing through the rod integrator 114 and the lens 116. The light source 122 is suitable for emitting a second color light 123, wherein the second color light 123 transmits to the dichroic mirror 130 after passing through the rod integrator 124 and the lens 126. The dichroic mirror 130 passes the first color light 113 and reflects the second color light 123 so that the first color light 113 can be integrated with the second color light 123.

The light-collecting modules 110 and 120 take up a lot of space for they are composed of many components. Accordingly, the volume of the illumination system 100 is very large. Besides, in such a design, the refractivity and reflectivity of the dichroic mirror 130 vary with the light incident angle, thus, the uniformities of the first color light 113 and the second color light 123 through the dichroic mirror 130 are different. Accordingly, an image projected by a projection apparatus using the conventional illumination system 100 may has the problem of poor uniformity.

SUMMARY OF THE INVENTION

Accordingly, the present invention is related to an illumination system which has smaller volume compared to a conventional illumination system.

An illumination system is provided for reducing the problem of inconsistent uniformities of various color lights in a conventional illumination system.

Additional aspects and advantages of the present invention will be set forth in part in following description.

The present invention provides an illumination system which includes a first integrator, a first dichroic element, a second dichroic element, a first light source, and a second light source. The first integrator has a first light incident end and a first light exit end opposite to each other. The first dichroic element is disposed at a part adjacent to the first light incident end, and the second dichroic element is disposed at another part adjacent to the first light incident end. The first dichroic element, the second dichroic element, and the first light incident end are arranged along a triangular track. The first light source is suitable for emitting a first color light, and the second light source is suitable for emitting a second color light. The first color light passes through the first dichroic element and is partially reflected by the second dichroic element to the first light incident end, and the second color light passes through the second dichroic element and is partially reflected by the first dichroic element to the first light incident end.

The present invention further provides an illumination system including a first integrator, a first light source, a second light source, a first dichroic element, and a second dichroic element. The first integrator has a first light incident end, a first light exit end opposite to the first light incident end, and a plurality of sidewalls connected between the first light incident end and the first light exit end. One of the sidewalls has a first incident region adjacent to the first light incident end. The first light source is disposed beside the first light incident end and is suitable for emitting a first color light towards the first light incident end, and the second light source is disposed beside the first incident region and is suitable for emitting a second color light towards the first incident region. The first dichroic element is disposed inside the first integrator and is located on transmission paths of the first color light and the second color light. The first color light passes through the first dichroic element toward the first light exit end, and the second color light is reflected by the first dichroic element toward the first light exit end. The second dichroic element is located between the first dichroic element and the second light source and covers the first incident region. The second color light passes through the second dichroic element, and the first color light is reflected by the second dichroic element.

In the present invention, the first color light and the second color light provided by the first light source and the second light enter the first integrator to be integrated without any light gathering device, thus, the volume of the entire illumination system can be reduced considerably. Moreover, the first color light and the second color light are uniformed in the first integrator, thus, the problem of inconsistent uniformities of various color lights in the conventional technique can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

These and other exemplary embodiments of the present invention will be described below and become more apparent from the detailed description of exemplary embodiments when read in conjunction with accompanying drawings. Those direction terms used in the present disclosure, such as "up", "down", "forward", "backward", "left", "right" etc, are only used for referring to directions in accompanied drawings. Thus, these terms are only-used for describing the present invention but not for restricting the present invention.

First Embodiment

Figure 1:
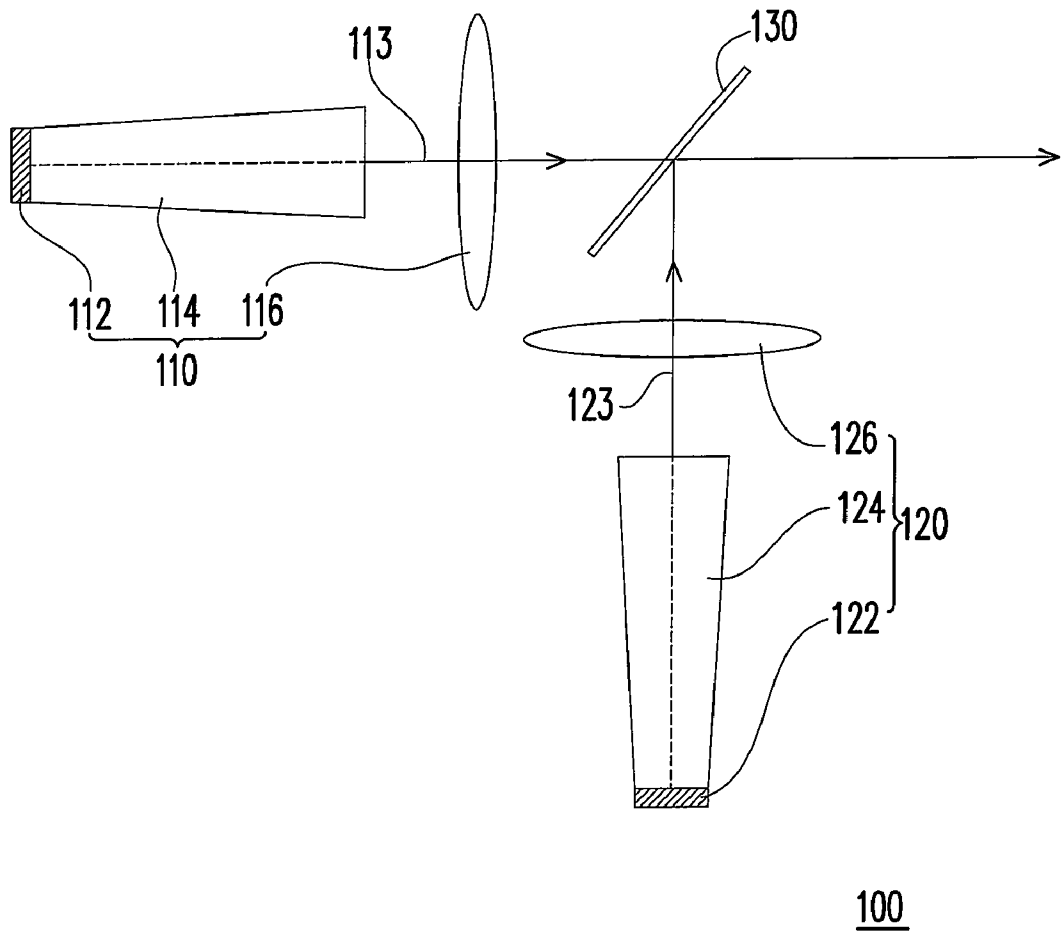
FIG. 1 is a schematic diagram of a conventional illumination system.
Figure 2A:
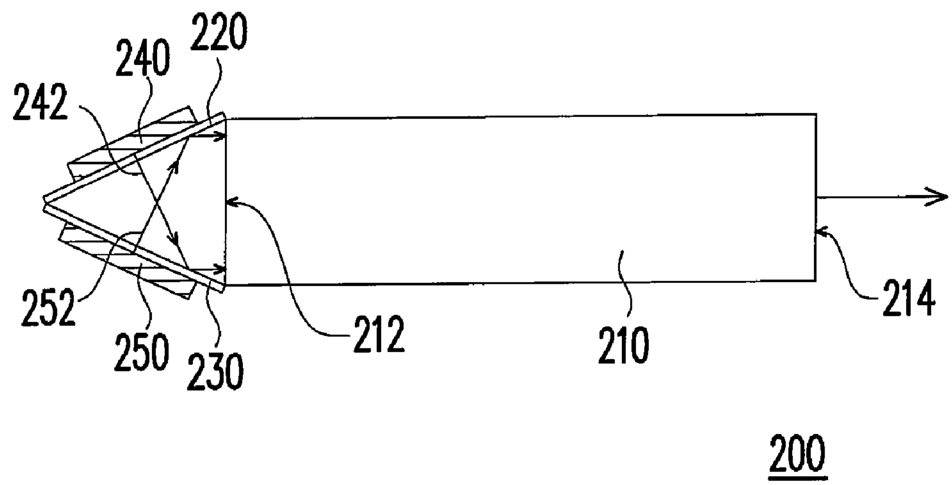
FIG. 2A is a schematic diagram of an illumination system according to a first embodiment of the present invention.

Referring to FIG. 2A, in the present embodiment, the illumination system 200 includes a first integrator 210, a first dichroic element 220, a second dichroic element 230, a first light source 240, and a second light source 250. The first integrator 210 has a first light incident end 212 and a first light exit end 214 opposite to each other. The first dichroic element 220 is disposed at a part adjacent to the first light incident end 212, and the second dichroic element 230 is disposed at another part adjacent to the first light incident end 212. The first dichroic element 220, the second dichroic element 230, and the first light incident end 212 are arranged along a triangular track. The first light source 240 is disposed adjacent to the first dichroic element 220 and is suitable for emitting a first color light 242 towards the first dichroic element 220, and the second light source 250 is disposed adjacent to the second dichroic element 230 and is suitable for emitting a second color light 252 towards the second dichroic element 230. The first color light 242 passes through the first dichroic element 220 and is partially reflected by the second dichroic element 230 to the first light incident end 212, and the second color light 252 passes through the second dichroic element 230 and is partially reflected by the first dichroic element 220 to the first light incident end 212. In the present embodiment, the first integrator 210 may be a rod integrator or a lenslet integrator.

The first light source 240 and the second light source 250 respectively include at least one point light source, and the light emitted by the point light source of the first light source 240 has different color from that of the light emitted by the point light source of the second light source 250. The point light sources may be light emitting diodes (LEDs). Besides, if the first light source 240 and the second light source 250 respectively include multiple point light sources, the lights emitted by the point light sources of the first light source 240 may have the same or different colors, while the lights emitted by the point light sources of the second light source 250 may also have the same or different colors. Moreover, the first light source 240 and the second light source 250 may or may not emit lights at the same time. In the first light source 240 and the second light source 250, those point light sources of the same colors may emit lights at the same time while point light sources of different colors may or may not emit lights at the same time. For example, the first light source 240 includes a plurality of green LEDs, the second light source 250 includes at least one blue LED and at least one red LED, and the green LEDs, the blue LED, and the red LED may emit lights at the same time or in turn.

In the present embodiment, the first dichroic element 220 and the second dichroic element 230 may be dichroic mirrors, and the first light source 240 and the second light source 250 may be respectively disposed on the first dichroic element 220 and the second dichroic element 230. After the first color light 242 emitted by the first light source 240 has passed through the first dichroic element 220A, a portion of the first color light 242 enters the first integrator 210 directly, and the other portion of the first color light 242 is reflected by the second dichroic element 230 and then enters the first integrator 210. After the second color light 252 emitted by the second light source 250 has passed through the second dichroic element 230, a portion of the second color light 252 enters the first integrator 210 directly, and the other portion of the second color light 252 is reflected by the first dichroic element 220 and then enters the first integrator 210. Next, the first color light 242 and the second color light 252 are integrated in the first integrator 210, and the integrated light is emitted from the first light exit end 214.

Since the first dichroic element 220 and the second dichroic element 230 can respectively reflect a portion of the first color light 242 and a portion of the second color light 252 which do not enter the first integrator 210 directly into the first integrator 210, light loss is reduced and accordingly light-collecting efficiency is increased. Besides, the illumination system 200 in the present embodiment has simpler structure compared to the conventional illumination system 100. Accordingly, the volume of the illumination system 200 is reduced considerably. Moreover, the first color light 242 and the second color light 252 are uniformed in the first integrator 210 after passing through the first dichroic element 220 and the second dichroic element 230, thus, the problem of inconsistent uniformities of various color lights can be reduced. Accordingly, an image projected by a projection apparatus using the illumination system 200 in the present embodiment has excellent uniformity.

Figure 2B:
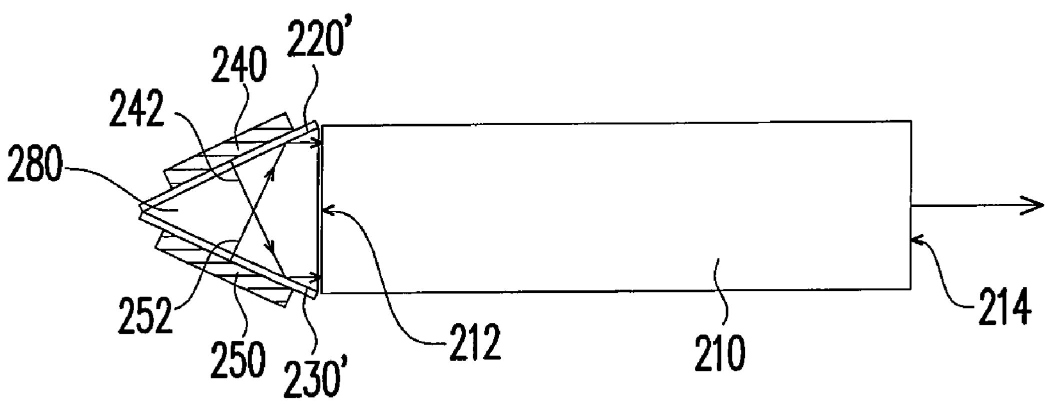
FIG. 2B is a schematic diagram of another illumination system according to the first embodiment of the present invention.

It should be noted that even though the first dichroic element 220 and the second dichroic element 230 are described above as dichroic mirrors, the first dichroic element and the second dichroic element in the present embodiment may also be coating layers coated on a triangular prism 280 (as shown in FIG. 2B). To be specific, the triangular prism 280 is disposed at the first light incident end 212, and the first dichroic element 220' and the second dichroic element 230' are coating layers on two surfaces of the triangular prism 280.

Figure 3:
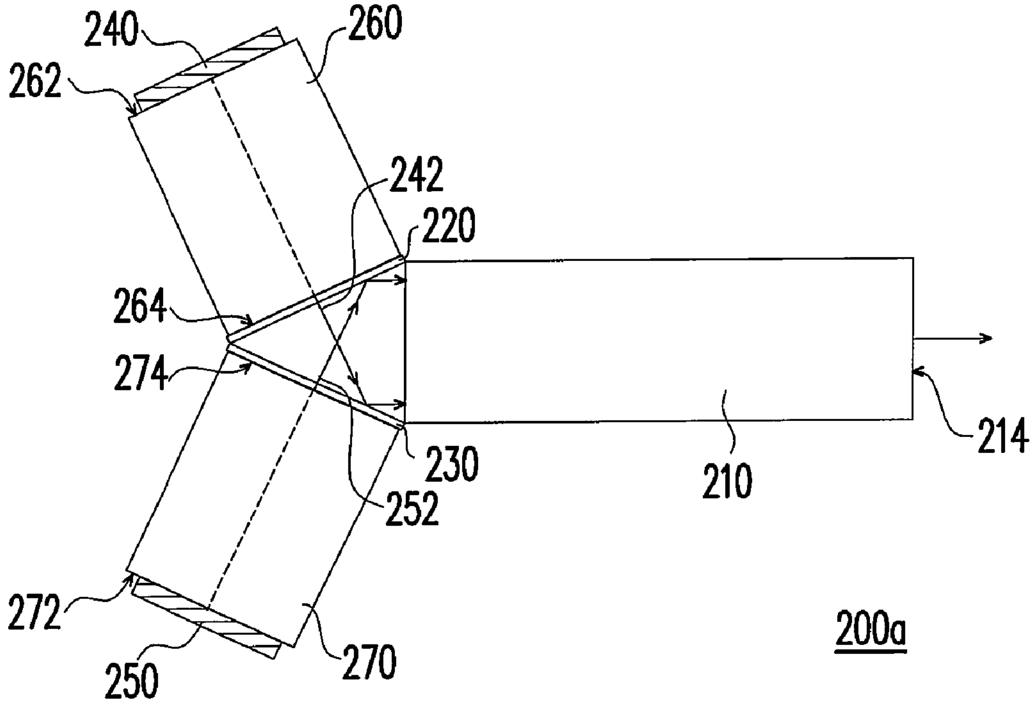
FIG. 3 is a schematic diagram of yet another illumination system according to the first embodiment of the present invention.

Referring to FIG. 3, compared to the illumination system 200 in FIG. 2A, the illumination system **200*a* in the present embodiment further includes a second integrator 260 and a third integrator 270. The second integrator 260 has a second light incident end 262 and a second light exit end 264 opposite to each other. The first light source 240 is located at the second light incident end 262, and the first dichroic element 220 is located at the second light exit end 264. The third integrator 270 has a third light incident end 272 and a third light exit end 274 opposite to each other. The second light source 250 is located at the third light incident end 272, and the second dichroic element 230 is located at the third light exit end 274**.

Since the first color light 242 and the second color light 252 can be respectively uniformed by the second integrator 260 and the third integrator 270 before they are uniformed by the first integrator 210, the uniformities of the first color light 242 and the second color light 252 can be further improved.

In the present embodiment, the first integrator 210, the second integrator 260, and the third integrator 270 may be solid rod integrators or hollow rod integrators. Besides, the first integrator 210, the second integrator 260, and the third integrator 270 may also be taper rods.

Second Embodiment

Figure 4A:
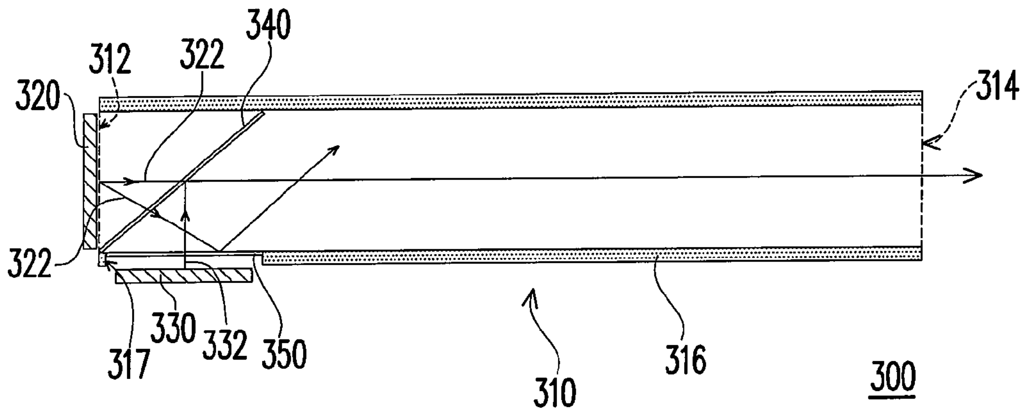
FIG. 4A is a schematic diagram of an illumination system according to a second embodiment of the present invention.

Referring to FIG. 4A, in the present embodiment, the illumination system 300 includes a first integrator 310, a first light source 320, a second light source 330, a first dichroic element 340, and a second dichroic element 350. The first integrator 310 has a first light incident end 312, a first light exit end 314 opposite to the first light incident end 312, and a plurality of sidewalls 316 connected between the first light incident end 312 and the first light exit end 314. One of the sidewalls 316 has a first incident region 317, and the first incident region 317 is adjacent to the first light incident end 312. The first light source 320 is disposed beside the first light incident end 312 and is suitable for emitting a first color light 322 towards the first light incident end 312. The second light source 330 is disposed beside the first incident region 317 and is suitable for emitting a second color light 332 towards the first incident region 317. The first dichroic element 340 is disposed inside the first integrator 310 and is located on transmission paths of the first color light 322 and the second color light 332. The first color light 322 passes through the first dichroic element 340 toward the first light exit end 314, and the second color light 332 is reflected by the first dichroic element 340 toward the first light exit end 314. The second dichroic element 350 is located between the first dichroic element 340 and the second light source 330 and is located at the first incident region 317. In the present embodiment, the first incident region 317 is a first opening, and the second dichroic element 350 covers the first opening. The second color light 332 passes through the second dichroic element 350, and the first color light 322 is reflected by the second dichroic element 350.

The first light source 320 and the second light source 330 are the same as the first light source 240 and the second light source 250 in the first embodiment, therefore which will not be described herein. In addition, the first dichroic element 340 and the second dichroic element 350 may be dichroic mirrors.

In the present embodiment, the first color light 322 passed through the first dichroic element 340 is integrated with the second color light 332 reflected by the first dichroic element 340, and the integrated light is then emitted from the light exit end 314 of the first integrator 310. The second dichroic element 350 at the first incident region 317 reflects the first color light 322 so that light loss caused by emission of the first color light 322 from the first incident region 317 can be prevented. Accordingly, the illumination system 300 has high light-collecting efficiency. Besides, compared to the conventional illumination system 100, the illumination system 300 in the present embodiment has simpler structure, therefore, the volume of the illumination system 300 can be reduced considerably. Moreover, the first color light 322 and the second color light 332 are uniformed after passing through the first dichroic element 340 and the second dichroic element 350, thus, the problem of inconsistent uniformities of various color lights in the conventional technique can be reduced. Accordingly, an image projected by a projection apparatus using the illumination system 300 in the present embodiment has excellent uniformity.

Figure 4B:
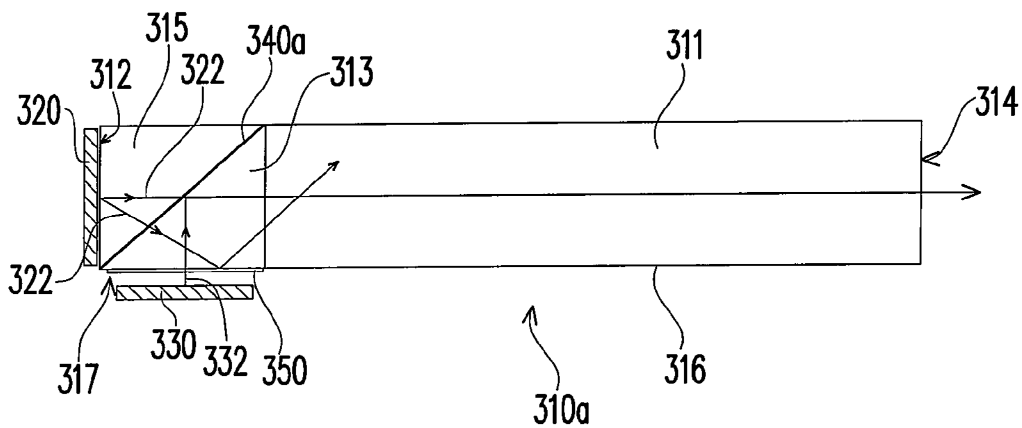
FIG. 4B is a schematic diagram of another illumination system according to the second embodiment of the present invention.

In addition, in the present embodiment, the first opening is used as the first incident region 317 for the second color light 332. However, if the first integrator is a solid rod integrator (for example, the first integrator 310*a* in FIG. 4B), the first integrator 310*a* does not have to provide the first opening and the second color light 332 can enter the first integrator 310*a* from the first incident region 317. The second dichroic element 350 can be integrated with the first incident region 317, or a diachronic film can be coated over the first incident region 317 as the second dichroic element 350. The first integrator 310*a* includes a rod 311 and two triangular prisms 313 and 315. The triangular prism 313 is connected to the rod 311, and a cube is formed with the triangular prism 313 and triangular prism 315. The first dichroic element 340*a* is a coating layer at the junction of the triangular prism 313 and the triangular prism 315. Besides, as in the first embodiment, the first integrator 310 can be replaced with other type of integrators such as a lenslet integrator.

Figure 4C:
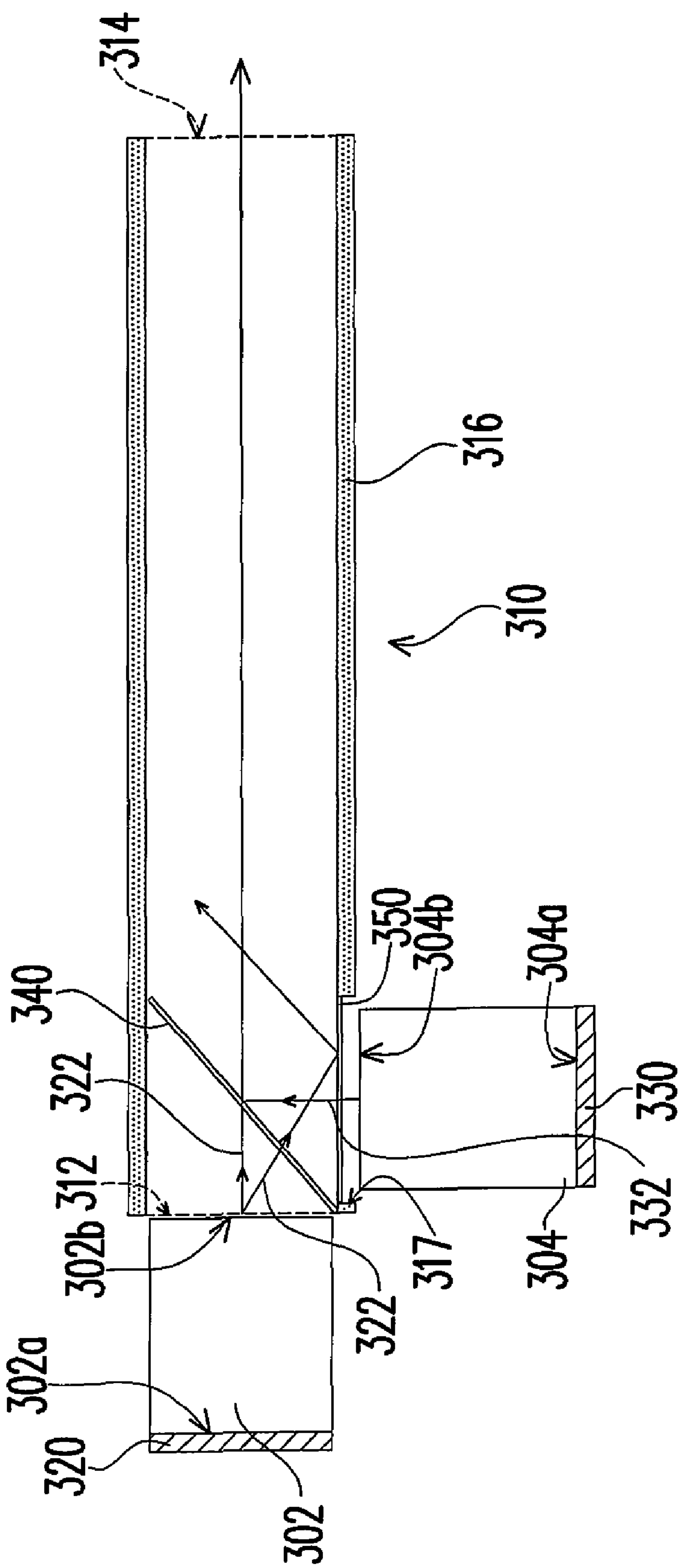
FIG. 4C is a schematic diagram of yet another illumination system according to the second embodiment of the present invention.

Referring to FIG. 4C, in the present embodiment, the illumination system 300 may further includes a second integrator 302 disposed between the first light source 320 and the first light incident end 312. The second integrator 302 has a second light incident end 302*a* and a second light exit end 302*b* opposite to each other. The first light source 320 is disposed at the second light incident end 302*a*, and the second light exit end 302*b* is adjacent to the first light incident end 312. Besides, the illumination system 300 may further include a third integrator 304 disposed between the second light source 330 and the second dichroic element 350. The third integrator 304 has a third light incident end 304*a* and a third light exit end 304*b* opposite to each other. The second light source 330 is disposed at the third light incident end 304*a*, and the third light exit end 304*b* is adjacent to the first incident region 317.

Figure 5:
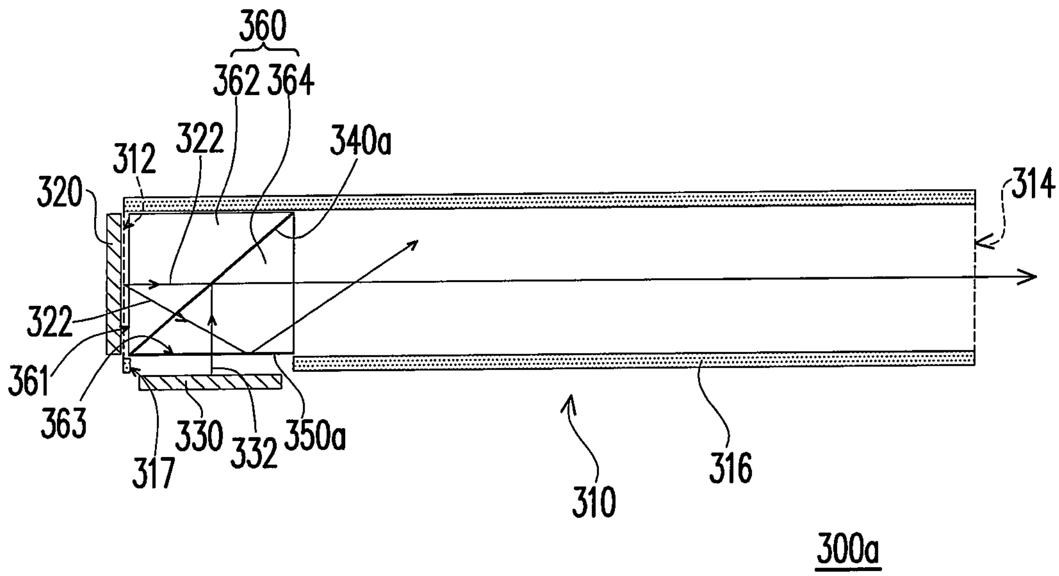
FIG. 5 is a schematic diagram of yet another illumination system according to the second embodiment of the present invention.

In FIG. 4A, the first dichroic element 340 and the second dichroic element 350 may also be coating layers on surfaces of a prism, and which will be described with reference to FIG. 5. Referring to FIG. 5, in the illumination system 300*a*, the first dichroic element 340*a* and the second dichroic element 350*a* are coating layers coated on two surfaces of a first prism 360. To be specific, the first prism 360 disposed inside the first integrator 310 is composed of two triangular prisms 362 and 364, wherein the first prism 360 has a first surface 361 adjacent to the first light incident end 312 and a second surface 636 adjacent to the first incident region 317. The second dichroic element 350*a* is a coating layer on the second surface 363, and the first dichroic element 340*a* is a coating layer at the junction of the triangular prism 362 and the triangular prism 364.

Third Embodiment

Figure 6A:
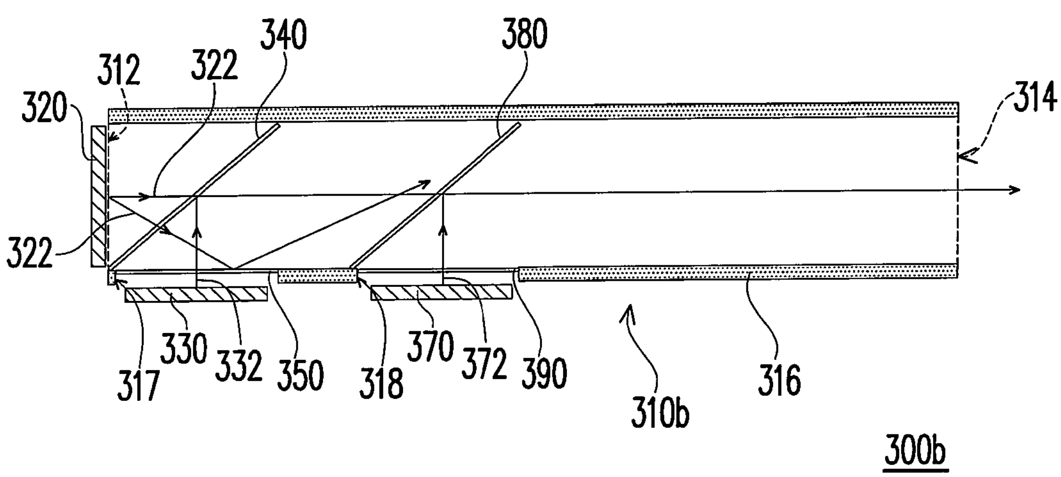
FIG. 6A is a schematic diagram of an illumination system according to a third embodiment of the present invention.

Referring to FIG. 6A, in the present embodiment, the illumination system 300*b* is similar to the illumination system 300 in FIG. 4A, therefore only the differences between the two illumination system 300 and 300*b* are described below. Compared to the illumination system 300, the first integrator 310*b* of the illumination system 300*b* further has a second incident region 318, and the illumination system 300*b* further includes a third light source 370, a third dichroic element 380, and a fourth dichroic element 390. The third light source 370 is disposed beside the second incident region 318 and is suitable for emitting a third color light 372 towards the second incident region 318. Besides, the third dichroic element 380 is disposed inside the first integrator 310*b* and is located on transmission paths of the first color light 322, the second color light 332, and the third color light 372. The first and second color light 322 and 332 pass through the third dichroic element 380, the third color light 372 is reflected by the third dichroic element 380, then the first, second and third color light 322, 332 and 372 transmit towards the first light exit end 314. In addition, the fourth dichroic element 390 is located between the third dichroic element 380 and the third light source 370 and is located at the second incident region 318. In the present embodiment, the second incident region 318 is a second opening, and the fourth dichroic element 390 covers the second opening. The third color light 372 passes through the fourth dichroic element 390 and the first color light 322 and the second color light 332 is reflected by the fourth dichroic element 390.

The third dichroic element 380 and the fourth dichroic element 390 may be dichroic mirrors. The third light source 370 includes at least one point light source, and if the third light source 370 includes multiple point light sources, the lights emitted by the point light sources of the third light source 370 may have the same or different colors. In addition, in an embodiment of the present invention, the first color light 322, the second color light 332, and the third color light 372 are respectively one of red color, green color, and blue color.

In the present embodiment, the first opening is used as the first incident region 317 for the second color light 332, and the second opening is used as the second incident region 318 for the third color light 372. If the first integrator **310*b* is a solid rod integrator, then the first integrator 310 does not have to provide the first opening and the second opening. The second color light 332 can enter the first integrator 310*b* from the same position as the first opening in FIG. 6A, and the third color light 372 can enter the first integrator 310*b* from the same position as the second opening in FIG. 6A. The second dichroic element 350 can be integrated with the first incident region 317, or a dichroic film can be coated at the first incident region 317 as the second dichroic element 350. The fourth dichroic element 390 can be integrated with the second incident region 318, or a dichroic film can be coated at the second incident region 318 as the fourth dichroic element 390. Moreover, as in the first embodiment, the first integrator 310*b*** can be replaced with other type of integrators such as a lenslet integrator.

In the present embodiment, the first color light 322 and the second color light 332 are integrated with the third color light 372 reflected by the third dichroic element 380 after the first color light 322 and the second color light 332 pass through the third dichroic element 380, and the integrated light is emitted from the light exit end 314 of the first integrator **310*b*. Since the fourth dichroic element 390 at the second incident region 318 can reflect the first color light 322 and the second color light 332, light loss caused by emission of the first color light 322 and the second color light 332 from the second incident region 318 can be prevented. Accordingly, the illumination system 300*b* has high light-collecting efficiency. Besides, compared to the illumination system 300, the illumination system 300*b* has three light sources, so that the illumination system 300*b*** can provide light beams of higher power.

Figure 6B:
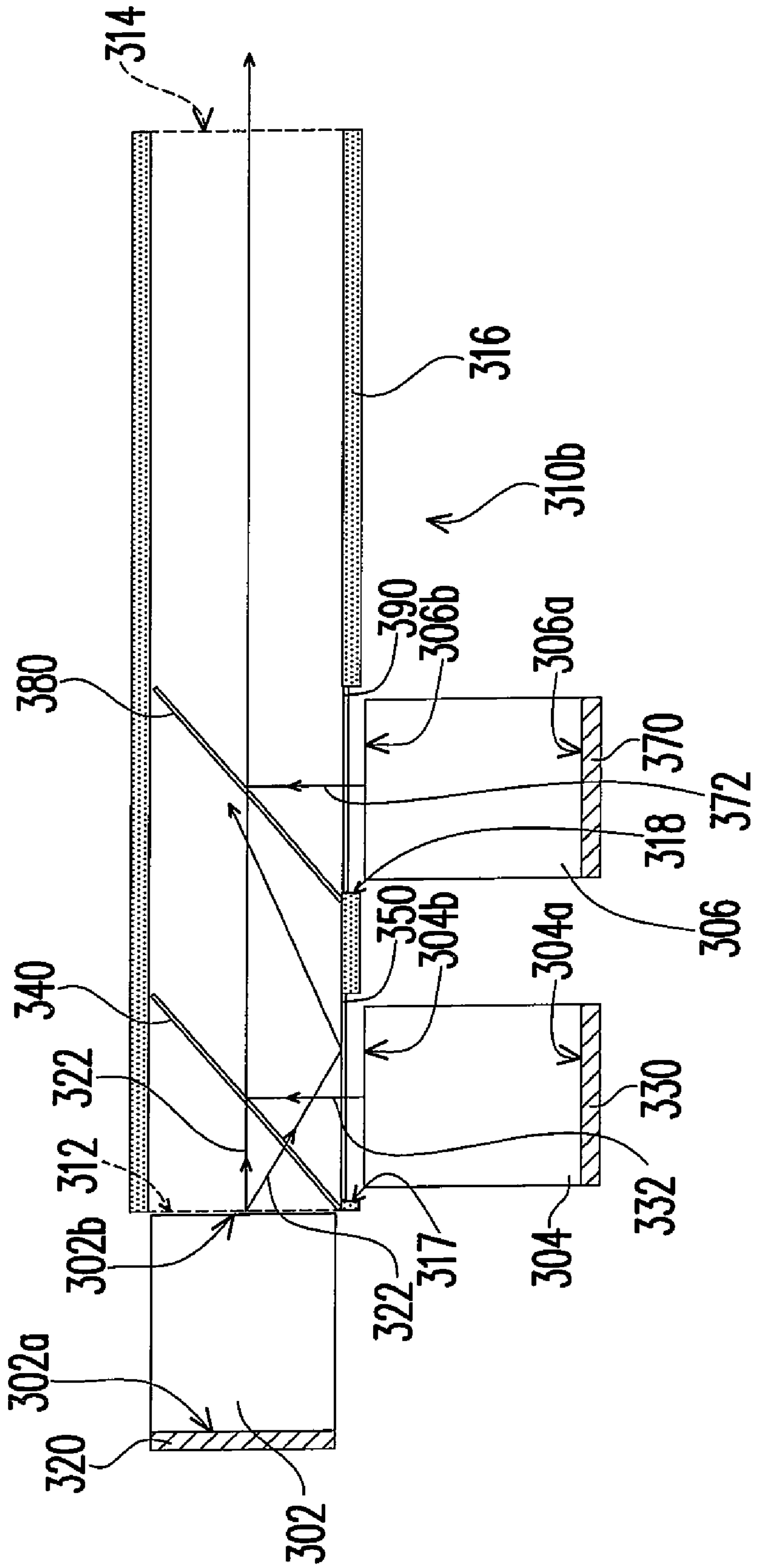
FIG. 6B is a schematic diagram of another illumination system according to the third embodiment of the present invention.

It should be noted that even though the first incident region 317 and the second incident region 318 are located on one sidewall 316 in FIG. 6A, the first incident region 317 and the second incident region 318 may also be located on two opposite sidewalls 316. In addition, similar to that in the second embodiment, the illumination system **300*b* may further include a second integrator 302, a third integrator 304, and a fourth integrator 306 (as shown in FIG. 6B), wherein the locations of the second integrator 302 and the third integrator 304 are the same as those in the second embodiment, therefore which will not be described herein. Besides, the fourth integrator 306 is disposed between the third light source 370 and the fourth dichroic element 390 and has a fourth light incident end 306*a* and a fourth light exit end 306*b* opposite to each other. The third light source 370 is disposed at the fourth light incident end 306*a*, and the fourth light exit end 306*b* is adjacent to the second incident region 318**.

Figure 7:
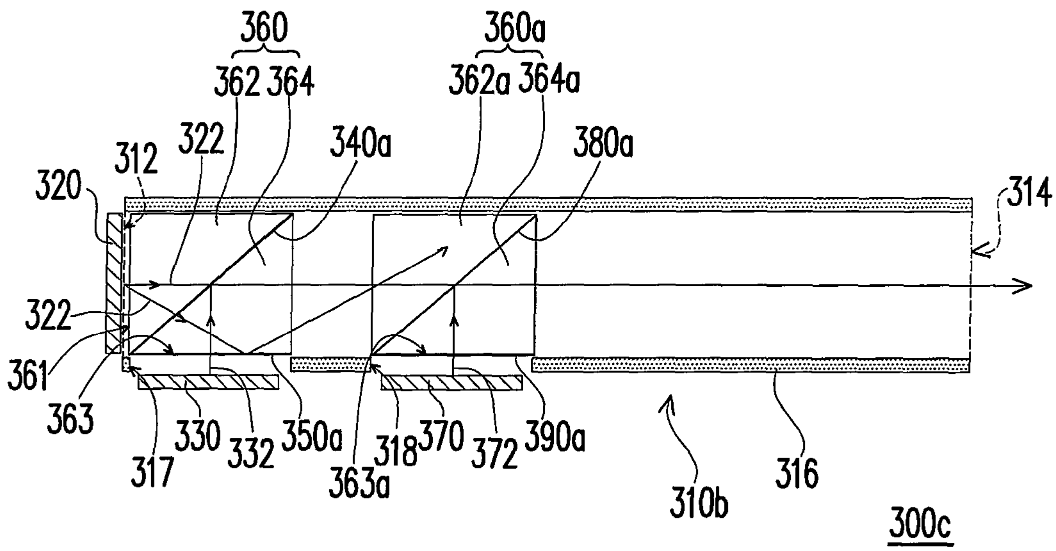
FIG. 7 is a schematic diagram of yet another illumination system according to the third embodiment of the present invention.

Besides dichroic mirrors, the first dichroic element 340, the second dichroic element 350, the third dichroic element 380, and the fourth dichroic element 390 may also be coating layers on prisms, and which will be described below with reference to FIG. 7. Referring to FIG. 7, in the illumination system **300*c*, the first dichroic element 340*a* and the second dichroic element 350*a* are coating layers on two surfaces of a first prism 360, and the third dichroic element 380*a* and the fourth dichroic element 390*a* are coating layers on two surfaces of a second prism 360*a*. The first prism 360 is the same as the first prism 360 in the second embodiment, therefore only the second prism 360*a* will be described in detail. The detail description of the first prism 360 is described in the second embodiment. In the illumination system 300*c*, the second prism 360*a* disposed inside the first integrator 310*b* is composed of two connected triangular prisms 362*a* and 364*a*, wherein the second prism 360*a* has a surface 363*a* adjacent to the second incident region 318. The fourth dichroic element 390*a* is a coating layer on the surface 363*a*, and the third dichroic element 380*a* is a coating layer at the junction of the triangular prism 362*a* and the triangular prism 364*a***.

Fourth Embodiment

Figure 8:
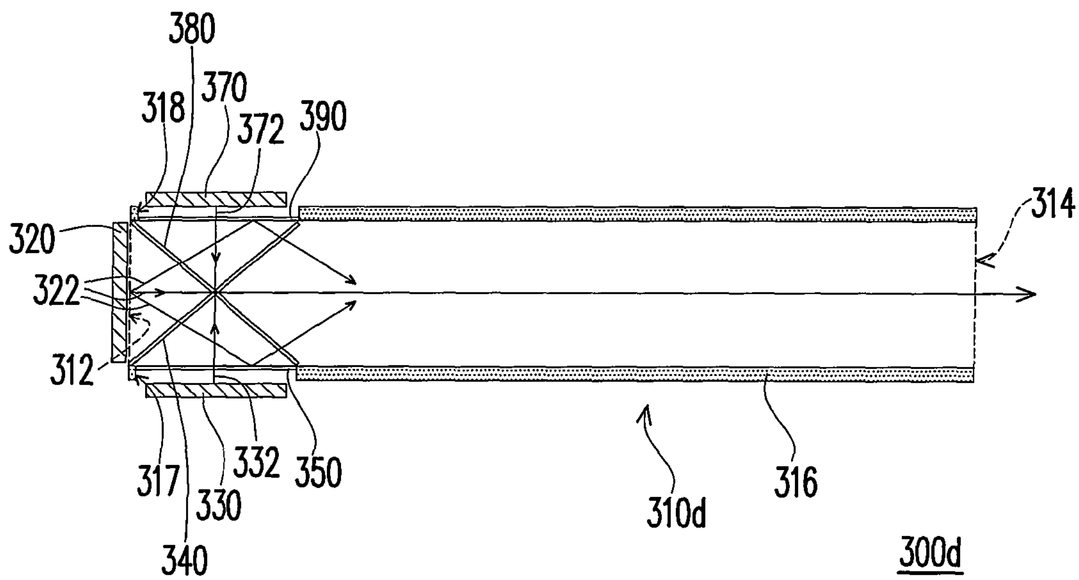
FIG. 8 is a schematic diagram of an illumination system according to a fourth embodiment of the present invention.

Referring to FIG. 8, the illumination system **300*d* in the present embodiment is similar to the illumination system 300*b* in FIG. 6A, and the difference between the two illumination system 300*b* and 300*d* is that in the illumination system 300*d*, the second incident region 318 of the first integrator 310*d* is opposite to the first incident region 317, and the first dichroic element 340 and the third dichroic element 380 are intersected. Besides, the advantages of the illumination system 300*d* are similar to those of the illumination system 300*b***, therefore which will not be described herein.

Figure 9:
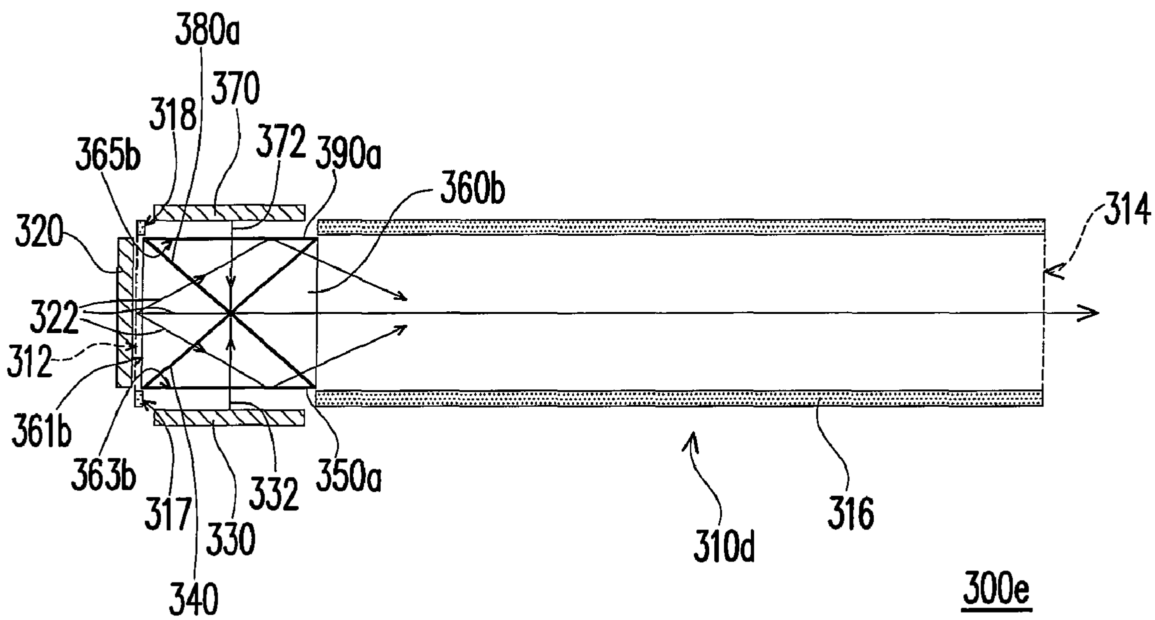
FIG. 9 is a schematic diagram of another illumination system according to the fourth embodiment of the present invention.

In the illumination system **300*d*, the first dichroic element 340, the second dichroic element 350, the third dichroic element 380, and the fourth dichroic element 390 may also be coating layers on surfaces of a prism, and which will be described below with reference to FIG. 9. Referring to FIG. 9, an X-prism 360*b* is disposed inside the first integrator 310*d* of the illumination system 300*e*. The X-prism 360*b* has a first surface 361*b* adjacent to the first light incident end 312, a second surface 363*b* adjacent to the first incident region 317, and a third surface 365*b* adjacent to the second incident region 318. The second dichroic element 350*a* and the fourth dichroic element 390*a* are respectively coating layers on the second surface 363*b* and the third surface 365*b*, and the first dichroic element 340*a* and the third dichroic element 380*a* are coating layers on two crossed surfaces in the X-prism 360*b***.

In overview, the illumination system in the present invention has at least one of the following advantages:

1. Lights of various colors provided by various light sources can enter the first integrator to be integrated without passing through any light gathering device. Thus, the illumination system in the present invention has simple structure, and accordingly, the volume of the illumination system can be reduced considerably.

2. Lights of various colors are uniformed in the first integrator after passing through various dichroic elements. Thus, the problem of inconsistent uniformities of various lights in conventional technique can be reduced, and accordingly, an image projected by a projection apparatus using the illumination system in the present invention has excellent uniformity.

3. Integrators can be added between various light sources and the first integrator for further improving the uniformities of various lights.

4. The illumination system in the present invention may include three light sources, thus, the illumination system can provide light beams of higher power.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An illumination system, comprising:

a first integrator, having a first light incident end and a first light exit end opposite to each other;

a first dichroic element, disposed at a part adjacent to the first light incident end;

a second dichroic element, disposed at another part adjacent to the first light incident end, wherein the first dichroic element, the second dichroic element, and the first light incident end are arranged along a triangular track;

a first light source, disposed adjacent to the first dichroic element for emitting a first color light; and a second light source, disposed adjacent to the second dichroic element for emitting a second color light, wherein the first color light passes through the first dichroic element and is partially reflected by the second dichroic element to the first light incident end, and the second color light passes through the second dichroic element and is partially reflected by the first dichroic element to the first light incident end.

2. The illumination system as claimed in claim 1, wherein the first dichroic element and the second dichroic element are dichroic mirrors.

3. The illumination system as claimed in claim 1 further comprising a triangular prism disposed at the first light incident end, wherein the first dichroic element and the second dichroic element are coating layers on two surfaces of the triangular prism.

4. The illumination system as claimed in claim 1, wherein the first light source and the second light source respectively comprise at least one point light source.

5. The illumination system as claimed in claim 1 further comprising a second integrator having a second light incident end and a second light exit end opposite to each other, wherein the first light source is disposed at the second light incident end, and the first dichroic element is disposed at the second light exit end.

6. The illumination system as claimed in claim 5 further comprising a third integrator having a third light incident end and a third light exit end opposite to each other, wherein the second light source is disposed at the third light incident end, and the second dichroic element is disposed at the third light exit end.

7. An illumination system, comprising:

a first integrator, having a first light incident end, a first light exit end opposite to the first light incident end, and a plurality of sidewalls connected between the first light incident end and the first light exit end, wherein one of the sidewalls has a first incident region adjacent to the first light incident end;

a first light source, disposed adjacent to the first light incident end for emitting a first color light towards the first light incident end;

a second light source, disposed adjacent to the first incident region for emitting a second color light towards the first incident region;

a first dichroic element, disposed inside the first integrator and located on transmission paths of the first color light and the second color light, wherein the first color light passes through the first dichroic element toward the first light exit end, and the second color light is reflected by the first dichroic element toward the first light exit end;

a second dichroic element, disposed between the first dichroic element and the second light source and located at the first incident region, wherein the second color light passes through the second dichroic element, and the first color light is reflected by the second dichroic element; and a second integrator, having a second light incident end and a second light exit end opposite to each other, wherein the first light source is disposed at the second light incident end, and the second light exit end is adjacent to the first light incident end.

8. The illumination system as claimed in claim 7, wherein the first dichroic element and the second dichroic element are dichroic mirrors.

9. The illumination system as claimed in claim 7 further comprising a first prism formed by two connected triangular prisms, wherein the first prism is disposed inside the first integrator and has a first surface adjacent to the first light incident end and a second surface adjacent to the first incident region, and the second dichroic element is a coating layer on the second surface, the first dichroic element is a coating layer at a junction of the triangular prisms.

10. The illumination system as claimed in claim 7, wherein the first light source and the second light source respectively comprise at least one point light source.

11. The illumination system as claimed in claim 7 further comprising a third integrator having a third light incident end and a third light exit end opposite to each other, wherein the second light source is disposed at the third light incident end, and the third light exit end is adjacent to the first incident region.

12. The illumination system as claimed in claim 7, wherein the first integrator further has a second incident region, and the illumination system further comprises:

a third light source, disposed beside the second incident region for emitting a third color light towards the second incident region;

a third dichroic element, disposed inside the first integrator and located on transmission paths of the first color light, the second color light, and the third color light, wherein the first and second color light pass through the third dichroic element, the third color light is reflected by the third dichroic element, then the first, second and third color light transmit towards the first light exit end; and a fourth dichroic element, disposed between the third dichroic element and the third light source and located at the second incident region, wherein the third color light passes through the fourth dichroic element and the first color light and the second color light is reflected by the fourth dichroic element.

13. The illumination system as claimed in claim 12, wherein the first incident region and the second incident region are located on one sidewall of the first integrator.

14. The illumination system as claimed in claim 12, wherein the first incident region and the second incident region are located on two opposite sidewalls of the first integrator.

15. The illumination system as claimed in claim 14, wherein the second incident region and the first incident region are opposite to each other, the first dichroic element and the third dichroic element are dichroic mirrors, and the first dichroic element and the third dichroic element are intersected.

16. The illumination system as claimed in claim 14, wherein the second incident region and the first incident region are opposite to each other, and the illumination system further comprises a X-prism disposed inside the first integrator, wherein the X-prism has a first surface adjacent to the first light incident end, a second surface adjacent to the first incident region, and a third surface adjacent to the second incident region, and the second dichroic element and the fourth dichroic element are coating layers respectively on the second surface and the third surface, the first dichroic element and the third dichroic element are coating layers on two crossed surfaces inside the X-prism.

17. The illumination system as claimed in claim 12, wherein the third dichroic element and the fourth dichroic element are dichroic mirrors.

18. The illumination system as claimed in claim 12 further comprising a first prism formed by two connected triangular prisms, wherein the first prism is disposed inside the first integrator and has a surface adjacent to the second incident region, and the fourth dichroic element is a coating layer on the surface while the third dichroic element is a coating layer at a junction of the triangular prisms.

19. The illumination system as claimed in claim 12, wherein the third light source comprises at least one point light source.

20. The illumination system as claimed in claim 12 further comprising a third integrator having a third light incident end and a third light exit end opposite to each other, wherein the third light source is disposed at the third light incident end, and the third light exit end is adjacent to the second incident region.

21. The illumination system as claimed in claim 12, wherein the sidewalls further have a first opening and a second opening, the first opening is used to define the first incident region, and the second opening is used to define the second incident region.

22. The illumination system as claimed in claim 21, wherein the second dichroic element covers the first opening, and the fourth dichroic element covers the second opening.

23. The illumination system as claimed in claim 12, wherein the first integrator is a solid rod integrator, the second dichroic element at the first incident region is a dichroic film, and the fourth dichroic element at the second incident region is a dichroic film.

* * * * *